(12) United States Patent
Ruvini

(10) Patent No.: US 9,892,447 B2
(45) Date of Patent: Feb. 13, 2018

(54) PERFORMING IMAGE SEARCHES IN A NETWORK-BASED PUBLICATION SYSTEM

(71) Applicant: eBay Inc., San Jose, CA (US)

(72) Inventor: Jean-David Ruvini, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 933 days.

(21) Appl. No.: 13/890,048

(22) Filed: May 8, 2013

(65) Prior Publication Data

US 2014/0337176 A1 Nov. 13, 2014

(51) Int. Cl.
*G06Q 30/00* (2012.01)
*G06Q 30/06* (2012.01)

(52) U.S. Cl.
CPC ..... *G06Q 30/0625* (2013.01); *G06Q 30/0603* (2013.01); *G06Q 30/0641* (2013.01)

(58) Field of Classification Search
CPC .................................. G06Q 30/0601–30/0645
USPC .............................................. 705/26.1–27.2
See application file for complete search history.

(56) References Cited

U.S. PATENT DOCUMENTS

| | | |
|---|---|---|
| 4,539,585 A | 9/1985 | Spackova et al. |
| 5,680,528 A | 10/1997 | Korszun |
| 5,724,522 A | 3/1998 | Kagami et al. |
| 5,850,222 A | 12/1998 | Cone |
| 5,950,173 A | 5/1999 | Perkowski |
| 5,930,769 A | 7/1999 | Rose |
| 6,307,568 B1 | 10/2001 | Rom |
| 6,310,627 B1 | 10/2001 | Sakaguchi |
| 6,546,309 B1 | 4/2003 | Gazzuolo |
| 6,665,577 B2 | 12/2003 | Onyshkevych |
| 6,701,207 B1 | 3/2004 | Gazzuolo |
| 6,882,897 B1 | 4/2005 | Fernandez |

(Continued)

FOREIGN PATENT DOCUMENTS

| | | |
|---|---|---|
| WO | WO-2012117360 A1 | 9/2012 |
| WO | WO-2014182889 A1 | 11/2014 |

OTHER PUBLICATIONS

Shim, S., Eastlick, M. A., Lotz, S. L., & Warrington, P. (2001). An online prepurchase intentions model: The role of intention to search. Journal of Retailing, 7(3), 397. Retrieved from https://dialog.proquest.com/professional/docview/676799386?accountid=142257.*

(Continued)

*Primary Examiner* — Resha Desai
(74) *Attorney, Agent, or Firm* — Shook, Hardy & Bacon L.L.P

(57) ABSTRACT

Methods and systems to perform image searches in a network-based publication system, such as image searches for items available for purchase via the network-based publication system, are described. In some example embodiments, the methods and systems access an image of an item, identify a purchaser of and/or user associated with the item in the image, query, using the image, a collection of images whose contents include items that are associated with the purchaser and that are offered for purchase by a network-based publication system, and match the item in the image to one or more of the items offered for purchase based on a result of the query. The network-based publication system may then present the matched one or more items, or recommendations for the matched items, to a user that provided the image.

20 Claims, 7 Drawing Sheets

(56) References Cited

U.S. PATENT DOCUMENTS

| | | | |
|---|---|---|---|
| 6,901,379 | B1 | 5/2005 | Balter et al. |
| 6,903,756 | B1 | 6/2005 | Giannini |
| 6,965,873 | B1 | 11/2005 | Rhoads |
| 7,013,290 | B2 | 3/2006 | Ananian |
| 7,039,486 | B2 | 5/2006 | Wang |
| 7,062,454 | B1 | 6/2006 | Giannini et al. |
| 7,113,918 | B1 | 9/2006 | Ahmad et al. |
| 7,133,839 | B2 | 11/2006 | Inoue et al. |
| 7,149,665 | B2 | 12/2006 | Feld et al. |
| 7,418,407 | B2 | 8/2008 | Giannini et al. |
| 7,433,753 | B2 | 10/2008 | Okada et al. |
| 7,548,794 | B2 | 6/2009 | Vandergriff et al. |
| 7,712,035 | B2 | 5/2010 | Giannini |
| 7,714,912 | B2 | 5/2010 | Faisman et al. |
| 7,905,028 | B2 | 3/2011 | Sieber |
| 8,078,498 | B2 | 12/2011 | Edmark |
| 8,078,499 | B1 | 12/2011 | Giannini et al. |
| 2002/0004753 | A1 | 1/2002 | Perkowski |
| 2002/0024517 | A1 | 2/2002 | Yamaguchi et al. |
| 2002/0158916 | A1 | 10/2002 | Gusler et al. |
| 2002/0169687 | A1 | 11/2002 | Perkowski |
| 2003/0101105 | A1 | 5/2003 | Vock |
| 2003/0110099 | A1 | 6/2003 | Trajkovic et al. |
| 2004/0004633 | A1 | 1/2004 | Perry et al. |
| 2005/0131776 | A1 | 6/2005 | Perotti et al. |
| 2005/0162419 | A1 | 7/2005 | Kim et al. |
| 2005/0234782 | A1 | 10/2005 | Schackne et al. |
| 2006/0080182 | A1 | 4/2006 | Thompson et al. |
| 2006/0271448 | A1 | 11/2006 | Inoue et al. |
| 2007/0220540 | A1 | 9/2007 | Walker et al. |
| 2007/0276721 | A1 | 11/2007 | Jackson |
| 2008/0163344 | A1 | 7/2008 | Yang |
| 2008/0255920 | A1 | 10/2008 | Vandergriff et al. |
| 2009/0115777 | A1 | 5/2009 | Reyers Moreno |
| 2009/0271705 | A1 | 10/2009 | Sheng et al. |
| 2009/0319388 | A1* | 12/2009 | Yuan et al. ............ 705/26 |
| 2010/0030578 | A1 | 2/2010 | Siddique et al. |
| 2010/0306716 | A1 | 12/2010 | Perez |
| 2011/0050549 | A1 | 3/2011 | Yamada et al. |
| 2011/0106662 | A1 | 5/2011 | Stinchcomb |
| 2011/0187743 | A1 | 8/2011 | Hwang et al. |
| 2011/0218846 | A1 | 9/2011 | Fieldman et al. |
| 2012/0158539 | A1 | 6/2012 | Lawrence et al. |
| 2012/0293513 | A1 | 11/2012 | Krishnaswamy |
| 2012/0293544 | A1 | 11/2012 | Miyamoto et al. |
| 2013/0322685 | A1 | 12/2013 | Li et al. |
| 2014/0095289 | A1* | 4/2014 | Mobberley ............ 705/14.33 |

OTHER PUBLICATIONS

"Augmented Reality Software Development Company, Zugara, Granted Patent on "Virtual Dressing Room" Platform", [Online]. Retrieved from the Internet: <URL: http://thirdwavefashion.com/2012/10/augmented-reality-software-development-company-zugara-granted-patent-on-virtual-dressing-room-platform/>, (Oct. 1, 2012), 3 pgs.

"Augmented-Reality "Virtual Dressing Room" Patent Issued", [Online]. Retrieved from the Internet: <URL: http://www.kurzweilai.net/augmented-reality-virtual-dressing-room-patent-issued>, (Sep. 26, 2012), 1 pg.

"Estonian Start-Up Creates Vitual Fitting Room", PRI's The World, [Online]. Retrieved from the Internet: <URL: http://www.theworld.org/2010/06/estonian-start-up-creates-virtual-fitting-room/>, (Jun. 28, 2010), 4 pgs.

"Fits.me—Virtual Fitting Room", [Online]. Retrieved from the Internet: <URL: http://fits.me/solutions/the-fits-me-virtual-fitting-room/>, (Accessed Aug. 5, 2013), 3 pgs.

"Fitting Reality Unveils VIPodium, the Next Generation Virtual Fitting Room, at DEMO Fall 2011", Marketwire Inc., [Online]. Retrieved from the Internet: <URL: http://www.marketwire.com/press-release/fitting-reality-unveils-vipodium-next-generation-virtual-fitting-room-demo-fall-2011-1560018.htm>, (Sep. 13, 2011), 2 pgs.

"Fitting Reality Unveils VIPodium, the Next Generation Vitual Fitting Room, at DEMO Fall 2011", Reuters, [Online]. Retrieved from the Internet: <URL: http://www.reuters.com/article/2011/09/13/idUS43994+13-Sep-2011+MW20110913>, (Sep. 13, 2011), 4 pgs.

"Webcam Social Shopper—Wikipedia", [Online]. Retrieved from the Internet: <URL: http://en.wikipedia.org/wiki/Webcam_Social_Shopper>, (accessed Aug. 2, 2013), 3 pgs.

Bosker, Bianca, "Tobi.com Fashionista: Online Shoppers Get virtual Fitting Room (Video)", [Online]. Retrieved from the Internet: <URL: http://www.huffingtonpost.com/2009/11/16/tobicom-fashionista-virtu_n_359674.html>, (Mar. 18, 2010), 2 pgs.

Britten, Fleur, "Brands Embrace an 'Augmented Reality'", The New York Times, [Online]. Retrieved from the Internet: <URL: http://www.nytimes.com/2011/09/21/fashion/fashion-embraces-augmented-reality-technology.html?_r=3&>, (Sep. 20, 2011), 3 pgs.

Dowbiggin, Robyn, "Virtual Fitting Rooms", Prezi Inc., [Online]. Retrieved from the Internet: <URL: http://prezi.com/gx0rrw5mulop/virtual-fitting-rooms/>, (Dec. 2, 2012), 2 pgs.

Gayomali, Chris, "Augmented Reality Lets You Try on Clothes from Online Shops", Time Inc., [Online]. Retrieved from the Internet: <URL: http://techland.time.com/2011/08/05/augmented-reality-lets-you-try-on-clothes-from-online-shops/>, (Aug. 5, 2011), 3 pgs.

Gross, Doug, "Macy's 'magic mirror' lets shoppers don virtual clothes", [Online]. Retrieved from the Internet: <URL: http://edition.cnn.com/2010/TECH/innovation/10/14/macys.virtual.mirror/index.html>, (Oct. 14, 2010), 2 pgs.

Heyman, Marshall, "The Barbie Closet: A Tweenage Dream", The Wall Street Journal, [Online]. Retrieved from the Internet: <URL: http://online.wsj.com/article/SB10001424052970204883304577219351219379714.html>, (Feb. 13, 2012), 4 pgs.

Kincaid, Jason, "Zugara's Augmented Reality Dressing Room Is Great If You Don't Care How Yoru Clothes Fit", [Online]. Retrieved from the Internet: <URL: http://techcrunch.com/2009/06/23/zugaras-augmented-reality-dressing-room-is-great-if-you-dont-care-how-your-clothes-fit/>, (Jun. 23, 2009), 4 pgs.

Kuang, Cliff, "its.Me's Shape-Shifting Robot Lets You Try on Clothes, Online [Video]", [Online]. Retrieved from the Internet: <URL: http://www.fastcodesign.com/1662372/fitsmes-shape-shifting-robot-lets-you-try-on-clothes-online-video>, (9/27/10), 5 pgs.

Moore, Stefany, "Try Me on", Internet Retailer, [Online]. Retrieved from the Internet: <URL: http://www.internetretailer.com/2012/02/01/try-me?p=1>, (Feb. 1, 2012), 7 pgs.

Moses, Asher, "Another Blow to Retailers: Virtual Dressing Rooms", The Sydney Morning Herald, [Online]. Retrieved from the Internet: <URL: http://www.smh.com.au/technology/technology-news/another-blow-to-retailers-virtual-dressing-rooms-20110809-1ijxa.html>, (Aug. 9, 2011), 5 pgs.

Perez, Sarah, "Retailer Lets Online Shoppers Virtually Try on Clothes Using Augmented Reality", [Online]. Retrieved from the Internet: <URL: http://readwrite.com/2011/08/04/retailer_lets_online_shoppers_virtually_try_on_clothes_using_augmented_reality#awesm=~odLW0uEnxNTTaU>, (Aug. 4, 2011), 3 pgs.

Sinsky, Regina, "Demo: Fitting Reality tries a new virtual dressing room on for size", [Online]. Retrieved from the Internet: <URL: http://venturebeat.com/2011/09/13/demo-fitting-reality-virtual-dressing-room/>, (Sep. 13, 2011), 3 pgs.

Takahashi, Dean, "DEMO: Zugara engages online shoppers with dress-up visualization", [Online]. Retrieved from the Internet: <URL: http://venturebeat.com/2011/02/28/demo-zugara-engages-online-shoppers-with-dress-up-visualization/>, (Feb. 28, 2011), 3 pgs.

"U.S. Appl. No. 13/488,020, Advisory Action dated Jan. 14, 2015", 3 pgs.

"U.S. Appl. No. 13/488,020, Final Office Action dated Oct. 8, 2014", 13 pgs.

"U.S. Appl. No. 13/488,020, Non Final Office Action dated Apr. 9, 2015", 16 pgs.

"U.S. Appl. No. 13/488,020, Non Final Office Action dated Jun. 18, 2014", 10 pgs.

(56) References Cited

OTHER PUBLICATIONS

"U.S. Appl. No. 13/488,020, Response filed Mar. 9, 2015 to Advisory Action dated Jan. 14, 2015", 10 pgs.
"U.S. Appl. No. 13/488,020, Response filed Sep. 8, 2015 to Non Final Office Action dated Apr. 9, 2015", 11 pgs.
"U.S. Appl. No. 13/488,020, Response filed Sep. 18, 2014 to Non Final Office Action dated Jun. 18, 2014", 10 pgs.
"U.S. Appl. No. 13/488,020, Response filed Dec. 8, 2014 to Final Office Action dated Oct. 8, 2014", 10 pgs.
"Application Serial No. PCT/US2014/037283, International Preliminary Report on Patentability dated Nov. 19, 2015", 7 pgs.
"International Application Serial No. PCT/US2014/037283, International Search Report dated Sep. 30, 2014", 2 pgs.
"International Application Serial No. PCT/US2014/037283, Written Opinion dated Sep. 30, 2014", 5 pgs.
Deniz, Oscar, et al., "Computer vision based eyewear selector", Journal of Zhejiang University SCIENCE C 11.2, (2010), 79-91.
Micilotta, Antonio S, et al., "Detection and Tracking of Humans by Probabilistic Body Part Assembly", BMVC. 2005.
Song, Shiwei, et al., "Virtual Glasses for Real People", (2009), 10 pgs.
"U.S. Appl. No. 13/488,020, Final Office Action dated Oct. 3, 2016", 16 pgs.
"U.S. Appl. No. 13/488,020, Final Office Action dated Dec. 17, 2015", 14 pgs.
"U.S. Appl. No. 13/488,020, Non Final Office Action dated Mar. 31, 2016", 16 pgs.
"U.S. Appl. No. 13/488,020, Response filed Mar. 14, 2016 to Final Office Action dated Dec. 17, 2015", 12 pgs.
"U.S. Appl. No. 13/488,020, Response filed Aug. 31, 2016 to Non Final Office Action mailed Mar. 31, 2016", 13 pgs.
Viola, Paul, et al, "Robust Real-Time Face Detection", International Journal of Computer Vision 57(2), 137-154, 2004, (2004), 137-154.
U.S. Appl. No. 13/488,020, filed Jun. 4, 2012, System and Method for Providing an Interactive Shopping Experience Via Webcam.

\* cited by examiner

PERFORMING IMAGE SEARCHES IN A NETWORK-BASED PUBLICATION SYSTEM

TECHNICAL FIELD

This application relates generally to information retrieval, and specifically, to a system and method for performing image searches in a network-based publication system.

BACKGROUND

General merchandising of items for sale via a network-based merchandising or publication system is well-known. Many websites accessible via the Internet are operated as online stores or auctions. These websites enable users to purchase items that may be physical items (e.g., an article of clothing), electronic data items (e.g., a downloadable digital media product), or services to be rendered by an affiliated service provider. To facilitate potential transactions and thereby improve user experiences, some websites provide recommendations of items to users. Often, a network-based merchandising system will enable users to search for items available for purchase, such as by received keywords and identifying items that include descriptions that match some or all of the keywords.

BRIEF DESCRIPTION OF THE DRAWINGS

The present technology is illustrated by way of example, and not by way of limitation, in the figures of the accompanying drawings.

DETAILED DESCRIPTION

Overview

Figure 1:
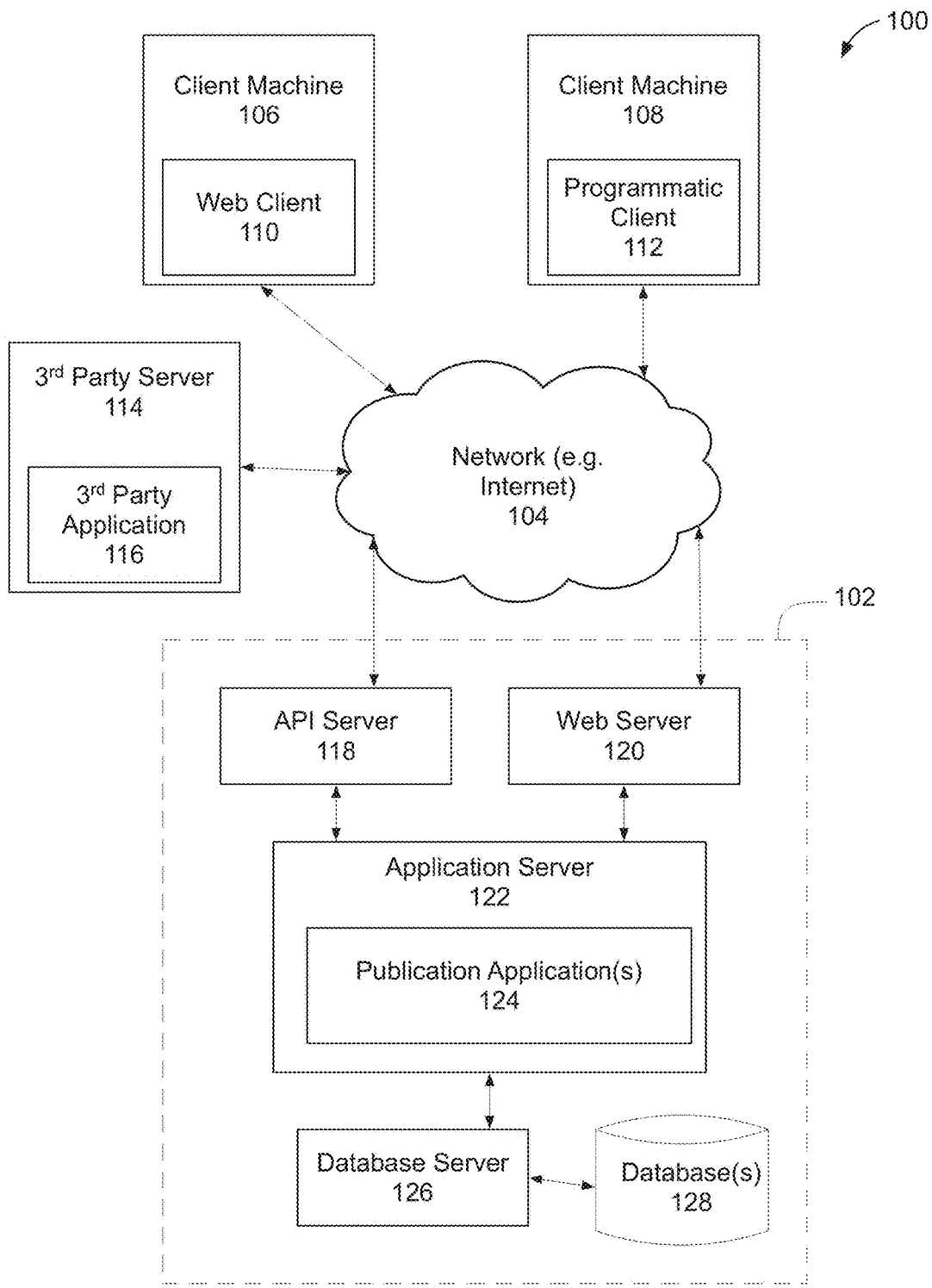
FIG. 1 is a block diagram illustrating a network architecture of a system used to perform image searches in a network-based publication system, in some example embodiments.

Methods and systems to perform image searches in a network-based publication system, such as image searches for items available for purchase via the network-based publication system, are described.

In some example embodiments, the methods and systems access an image of an item, identify a purchaser, owner and/user associated with the item in the image, query, using the image, a collection of images whose contents include items associated with the purchaser and offered for purchase by a network-based publication system, and match the item in the image to one or more of the items offered for purchase based on a result of the query. The network-based publication system may then present one or more items, or recommendations for the matched items, to a user that provided the image.

In some example embodiments, the methods and systems receive an image of an item, receive information identifying a user of a network-based publication system that is associated with the item in the image, query, using the received image, a collection of images whose contents include items previously purchased by the user from the network-based publication system, match an available item provided by the network-based publication system to the item in the received image based on a result of the query, and cause a user interface to be presented that enables a purchase of the available item provided by the network-based publication system.

For example, John likes his friend Mary's antique rocking chair, and wants to find one to purchase for his children. Mary mentions an online retail site where she purchased the chair, but does not remember any identifying information about the chair. John uses his mobile device and captures an image (e.g., takes a picture) of the rocking chair, and sends the image, along with information identifying Mary as a previous purchaser of the chair, to the online retail site, in order to search the online retail site for the chair. The site, via an image search engine, receives the image and the information (e.g., a user ID) identifying Mary. Instead of querying all images (or, all chair images) within the online retail site, the image search engine, having knowledge that the item in the image was previously purchased by Mary, searches a collection of images associated with items previously purchased and viewed by Mary at the online retail site. The image search engine matches the received image with one of the images in the collection of images, and identifies the rocking chair owned by Mary. Although the exact same chair is not available for purchase, the online retail site presents John, via his mobile device, with other rocking chairs available for purchase that are similar to the chair owned by Mary.

Thus, by using information identifying a purchaser of an item that is the subject of an image search and/or image-based search, a network-based merchandising and/or publication system, or an integrated search engine, may be able to constrain a corpus of images that is searched with a query image, and facilitate fast, effective identification of items available for purchase from the system, among other things. The system and methods, therefore, enable a network-based merchandising and/or publication system with an effective mechanism to present items available for purchase in response to image-based queries, among other things.

Suitable System

In the following description, for purposes of explanation, numerous specific details are set forth in order to provide a thorough understanding of the present disclosure. It may be evident, however, to one skilled in the art that the subject matter of the present disclosure may be practiced without these specific details.

FIG. 1 is a block diagram illustrating a network architecture of a system 100 used to perform image searches in a network-based publication system, in some example embodiments. For example, the system 100 may be a network-based publication system 102 where clients may communicate and exchange data within the system 100. The data may pertain to various functions (e.g., selling and purchasing of items) and aspects (e.g., data describing items listed on the network-based publication system 102) associated with the system 100 and its users. Although illustrated herein as a client-server architecture as an example, other example embodiments may include other network architectures, such as a peer-to-peer or distributed network environment.

A data exchange platform, in an example form of a network-based publication system 102, may provide server-side functionality, via a network 104 (e.g., the Internet) to one or more clients. The one or more clients may include users that utilize the system 100 and more specifically, the network-based publication system 102, to exchange data over the network 104. These transactions may include transmitting, receiving (communicating) and processing data to, from, and regarding content and users of the system 100. The data may include, but are not limited to, content and user data such as feedback data; user reputation values; user profiles; user attributes; product and service reviews; product, service, manufacture, and vendor recommendations and identifiers; product and service listings associated with buyers and sellers; auction bids; and transaction data, among other things.

In various embodiments, the data exchanges within the system 100 may be dependent upon user-selected functions available through one or more client or user interfaces (UIs). The UIs may be associated with a client machine, such as a client machine 106 using a web client 110. The web client 110 may be in communication with the network-based publication system 102 via a web server 120. The UIs may also be associated with a client machine 108 using a programmatic client 112, such as a client application, or a third party server 114 hosting a third party application 116. It can be appreciated in various embodiments the client machine 106, 108, or third party server 114 may be associated with a buyer, a seller, a third party electronic commerce platform, a payment service provider, or a shipping service provider, each in communication with the network-based publication system 102 and optionally each other. The buyers and sellers may be any one of individuals, merchants, or service providers, among other things.

In some example embodiments, the client machine 106 and/or the client machine 108 may be a mobile device (e.g., smart phone, tablet, laptop, digital camera, and so on) that includes components capable of capturing images of items and other objects. For example, the client machines 106, 108 may include imaging components, such as cameras, solid-state imaging devices, and so on.

Turning to the network-based publication system 102, an application program interface (API) server 118 and a web server 120 are coupled to, and provide programmatic and web interfaces respectively to, one or more application servers 122. The application servers 122 host one or more publication application (s) 124. The application servers 122 are, in turn, shown to be coupled to one or more database server(s) 126 that facilitate access to one or more database(s) 128.

In some example embodiments, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., programmatic client 112 or third party application 116) running on another client machine (e.g., client machine 108 or third party server 114).

The publication application(s) 124 may provide a number of publisher functions and services (e.g., search, listing, payment, etc.) to users that access the network-based publication system 102. For example, the publication application(s) 124 may provide a number of services and functions to users for listing goods and/or services for sale, searching for goods and services, facilitating transactions, and reviewing and providing feedback about transactions and associated users. Additionally, the publication application(s) 124 may track and store data and metadata relating to listings, transactions, and user interactions with the network-based publication system 102.

FIG. 1 also illustrates a third party application 116 that may execute on a third party server 114 and may have programmatic access to the network-based publication system 102 via the programmatic interface provided by the API server 118. For example, the third party application 116 may use information retrieved from the network-based publication system 102 to support one or more features or functions on a website hosted by the third party. The third party website may, for example, provide one or more listing, feedback, publisher or payment functions that are supported by the relevant applications of the network-based publication system 102.

While the example system 100 of FIG. 1 employs a client-server architecture, a skilled artisan will recognize that the present disclosure is not limited to such an architecture. The example system 100 can equally well find application in, for example, a distributed or peer-to-peer architecture system.

Figure 2:
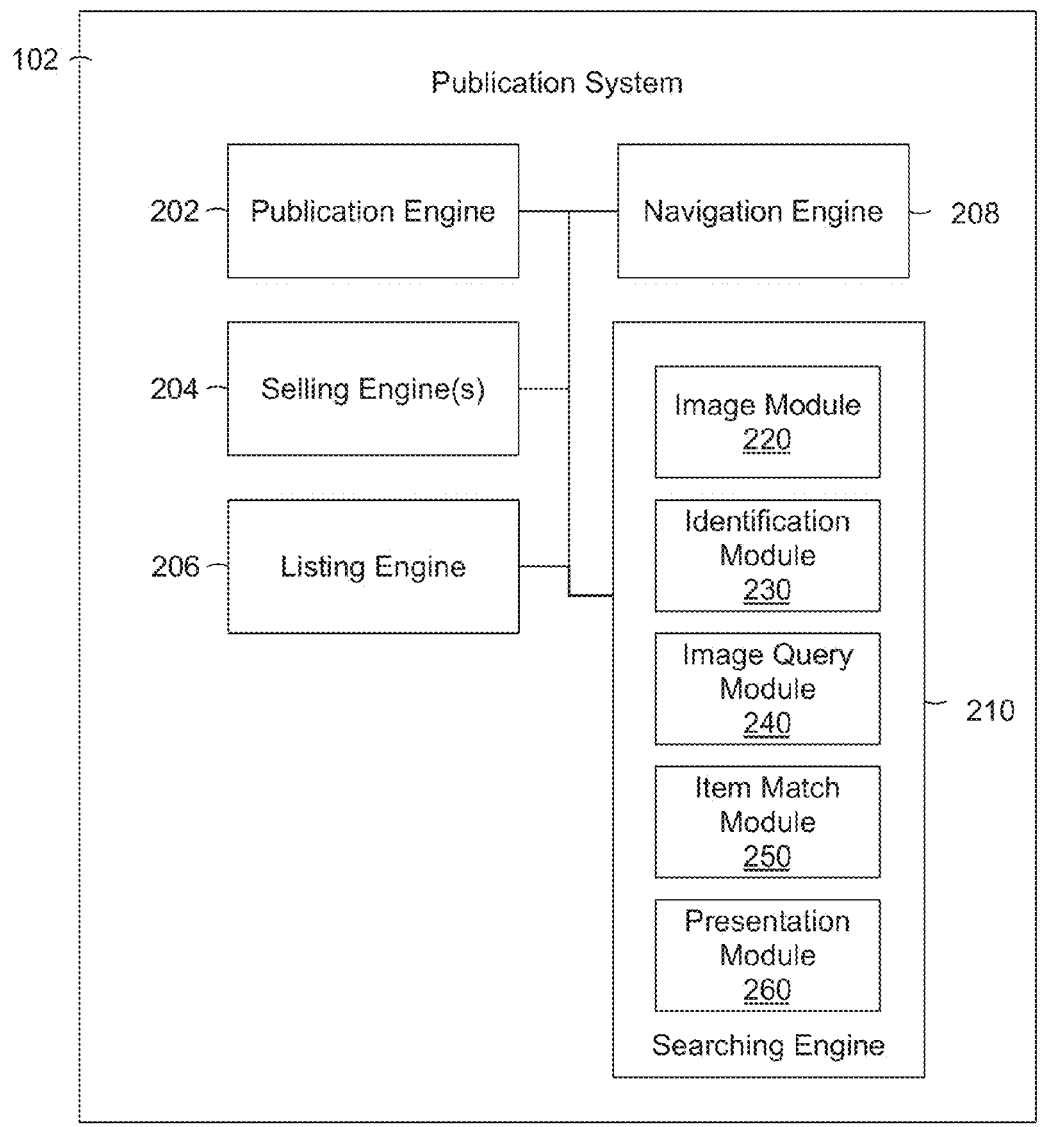
FIG. 2 is a block diagram illustrating a publication system of available products, in some example embodiments.

Referring now to FIG. 2, an example block diagram illustrating multiple components that, in some example embodiments, are provided within the network-based publication system 102 of the networked system 100 is shown. The network-based publication system 102 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 128 via the one or more database servers 126, both shown in FIG. 1.

In some example embodiments, the publication system 102 comprises a network-based marketplace and provides a number of publishing, listing, and price-setting mechanisms whereby a seller (e.g., business or consumer) may list (or publish information concerning) goods or services for sale, a buyer can search for, express interest in, or indicate a desire to purchase such goods or services, and a price can be set for a transaction pertaining to the goods or services. To this end, the network-based publication system 102 may comprise at least one publication engine 202 and one or more selling engines 204. The publication engine 202 may publish information, such as item listings or product description pages, on the network-based publication system 102. In some example embodiments, the selling engines 204 may comprise one or more auction engines that support auction-format listing and price setting mechanisms (e.g., English, Dutch, Chinese, Double, Reverse auctions, and so on). The various auction engines may also provide a number of features in support of these auction-format listings, such as a reserve price feature whereby a seller may specify a reserve price in connection with a listing and a proxy-bidding feature whereby a bidder may invoke automated proxy bidding.

A listing engine 206 allows sellers to conveniently author listings of items or authors to author publications. In some example embodiments, the listings pertain to goods or services that a user (e.g., a seller) wishes to transact via the network-based publication system 102. Each good or service is associated with a particular category. The listing engine 206 may receive listing data such as title, description, and aspect name/value pairs. Furthermore, each listing for a good or service may be assigned an item identifier. In some example embodiments, a user may create a listing that is an advertisement or other form of information publication. The listing information may then be stored to one or more storage devices coupled to the network-based publication system 102 (e.g., databases 128). Listings also may comprise product description pages that display a product and information (e.g., product title, specifications, reviews, and so on) associated with the product. In some example embodiments, the product description page may include an aggregation of item listings that correspond to the product described on the product description page.

In a further example, a navigation engine 208 allows users to navigate through various categories, catalogs, or inventory data structures according to which listings may be classified within the network-based publication system 102. For example, the navigation engine 208 allows a user to successively navigate down a category tree comprising a hierarchy of categories until a particular set of listing is reached. Various other navigation applications within the navigation engine 208 may be provided to supplement the searching and browsing applications. The navigation engine 208 may record the various user actions (e.g., clicks) performed by the user in order to navigate down the category tree.

Searching the network-based publisher 102 is facilitated by a searching engine 210. For example, the searching engine 210 enables keyword queries of listings published via the network-based publication system 102 and/or image queries of images associated with the listings published via the network-based publication system 102. In some example embodiments, the searching engine 210 receives the image queries from a computing or mobile device associated with a user (e.g., client machine 106 or 108) and conducts a review of the storage device storing the listing information. The review will enable compilation of a result set of listings that may be sorted and returned to the client device (e.g., client machine 106 or 108) associated with the user. The searching engine 210 may record the query (e.g., the query image) and any subsequent user actions and behaviors (e.g., navigations).

In order to facilitate image-based searching within the network-based publication system 102, the searching engine 210, in some example embodiments, may include one or more modules and/or components to perform one or more operations of the searching engine 210. The modules may be hardware, software, or a combination of hardware and software. The modules may be executed by one or more processors. For example, the searching engine 210 may include an image module 220, an identification module 230, an image query module 240, an item match module 250, and a presentation module 260.

In some example embodiments, the image module 220 is configured and/or programmed to access an image of an item. The image module 220 may receive and/or otherwise access information associated with an image of an item or object. For example, the image module 220 may receive or otherwise access an image taken and/or captured by a camera of the client machine 106, 108 that is associated with a user of the network-based publication system 102.

In some example embodiments, the image module 220 may access the image of the item from various locations over the network 104, such as other online retail sites, social networks, image repositories, and so on. For example, the image module 220 may access images from a social network service that includes a user who provided the image as a member, such as images uploaded to the social network service from other members of the social network service that are connected to the user who provided the image.

In some example embodiments, the identification module 230 is configured and/or programmed to identify a purchaser and/or owner of the item in the image. The identification module 230 may identify the purchases of the item in the image as a user of the network-based publication system 102 by receiving a user ID or other identification information associated with the user. For example, a user who provides an image of an item to the searching engine 210 may also provide information identifying another user of the network-based publication system 102 as a previous purchaser of the item in the image.

Figure 3:
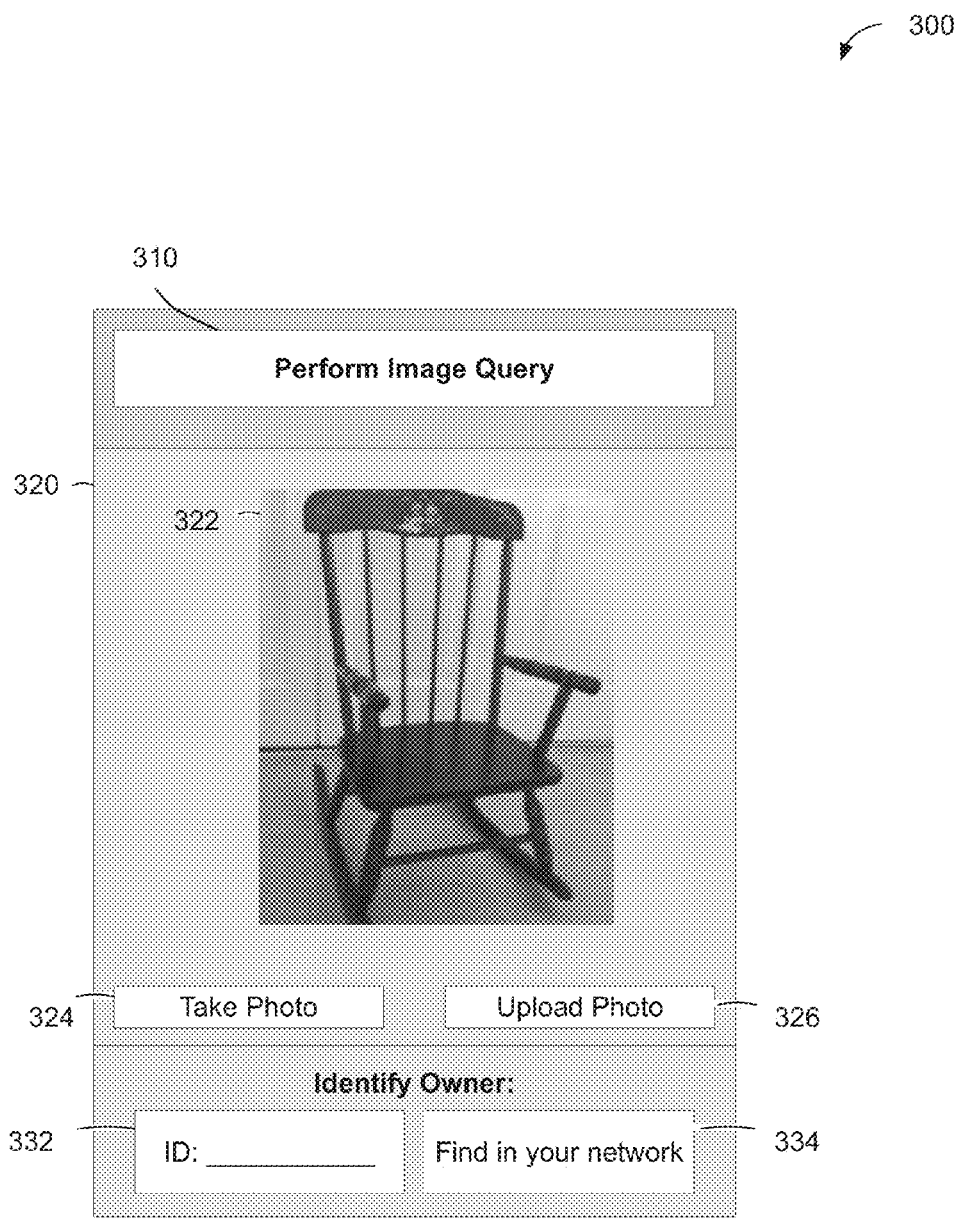
FIG. 3 is a display diagram illustrating an example user interface associated with receiving a query image, in some example embodiments.

As an example, FIG. 3 is a display diagram illustrating a user interface 300 associated with receiving a query image. The user interface 300 includes a user-selectable element or button 310 configured to initiate a query of the network-based publication system 102 via the searching engine 210, an image capture element 320, and a purchaser identification element, such as display element 332 or 334.

The image capture element 320 may cause a camera of the client machine 106 or 108 (e.g., a camera of a mobile device) to take a picture or image 322 of an item or object in response to receiving a selection of a user-selectable button 324, and/or may upload a picture or image 322 of the item or object from various locations (e.g., memory storage of the mobile device, social network services, image repositories, and so on), among other things, using user-selectable button 326. The purchaser identification element may be a display element 332 that receives information identifying the purchaser of the item or object in the image 322, such as a user ID or first and last name of another user of the network-based publication system 102, and/or a display element 334 that searches one or more social network services that include the user of the client machine 106 or 108 as a member for information associated with the purchaser of the item or object in the image, such member profile information for the purchaser of the item or object, among other things. Thus, the searching engine 210 may provide, via the image module 220 and/or the identification module 230, a user interface 300 that facilitates the reception of a query image whose contents include an item or object to be identified, and the reception of information identifying an purchaser, owner, and/or user associated with the item or object in the query image. Of course, the user interface 300 may include other elements not shown in FIG. 3.

Referring back to FIG. 2, in some example embodiments, the image query module 240 is configured to query, using the image of the item or object, a collection of images whose contents include items that are associated with the purchaser and that are offered for purchase or otherwise provided by the network-based publication system 102. The image query module 240 may query a collection or group of images associated with items previously purchased by the purchaser via the network-based publication system 102.

For example, the image query module 240, using some or all components of the searching engine 210, may perform image-based queries of groups or sets of images contained by the network-based publication system 102 whose contents include items previously viewed and/or purchased by the purchaser via the network-based publication system 102. Thus, in some example embodiments, the image query module 240 may constrain the corpus of images to be searched to only include images for items or products associated with the purchaser of the item in the query image.

The image query module 240, therefore, may query a database of images associated with the purchaser, such as a database depicted by Table 1, which is associated with a purchaser (e.g., a user with an ID of "janejones"):

TABLE 1 example database for purchaser "janejones"

| Image ID | Item ID | Item metadata |
|---|---|---|
| Chair1 | Chair23345 | Rocking chair, brown, vintage, wood |
| Shirt3 | Blouse223 | Blue, cotton, small, buttons |
| Toy6 | Puzzle43434 | Toddler, wood, shapes |

Of course, the database of Table 1 may include other information or entries not shown. Following the example, performing a query using a query image of a chair may lead to a match of the query image to an image having an image ID of "Chair1," which represents an item having an ID of "Chair23345," which was an item previously available by the network-based publication system 102 and previously purchased by the user "janejones."

As another example, the image query module 240, using some or all components of the searching engine 210, may perform image-based queries of groups or sets of images contained by the network-based publication system 102 whose contents include items previously viewed and/or purchased via the network-based publication system 102 by one or more other users that are associated with a user who provided the query image. For example, the image query module 240 may identify certain users of the network-based publication system 102 as "friends" or connections to the user that provided the query image, and add any images for items associated with the friends or connections to the corpus of images that is searched using the query image. Thus, in some example embodiments, the image query module 240 may constrain the corpus of images to be searched to only include images for items or products associated with users that are recognized and/or determined to be friends or otherwise connected to a user who provided the query image.

In some example embodiments, the item match module 250 is configured and/or programmed to match the item in the image to one or more items offered for purchase or otherwise provided by the network-based publication system 102 based on a result of the query. The item match module 250 may determine that the item matches another item based on a result that characteristics of the query image of the item match at least one or more characteristics of one or more items offered by the network-based publication system 102. For example, the item match module 250 may exactly or definitively determine that an item in a query image is a specific item (e.g., a specific rocking chair) currently or previously offered for purchase by the network-based publication system 102 and/or may determine that the item in the query image is associated with a category of items (e.g. is a "red shirt" or "pen") offered for purchase by the network-based publication system 102.

The item match module 250 may utilize a variety of different image search or identification systems and associated techniques, such as content-based image retrieval (CBIR) systems and techniques. For example, the item match module 250 may employ a "query by example" technique that extracts a shape or object from a captured image and uses the extracted shape or object to search for matching images. Other techniques utilized by the item match module 250 may include image distance measurement and/or filtering techniques (e.g., using color, texture, shape, and so on to match images), semantic retrieval techniques, and other known image query methods.

In some example embodiments, the presentation module 260 is configured and/or programmed to cause a user interface provided by a mobile device (e.g. client machine 106 or 108) associated with a user to present information associated with one or more items offered by the network-based publication system 102 that match the item in the image. For example, the presentation module 260 may cause the user interface of the mobile device to present recommendations, via a recommendation page, for various products offered for sale by the network-based publication system 102, and/or cause the user interface of the mobile device to present a product purchase page that facilitates a purchase by the user of items that match the item in the query image from the network-based publication system 102.

Figure 4:
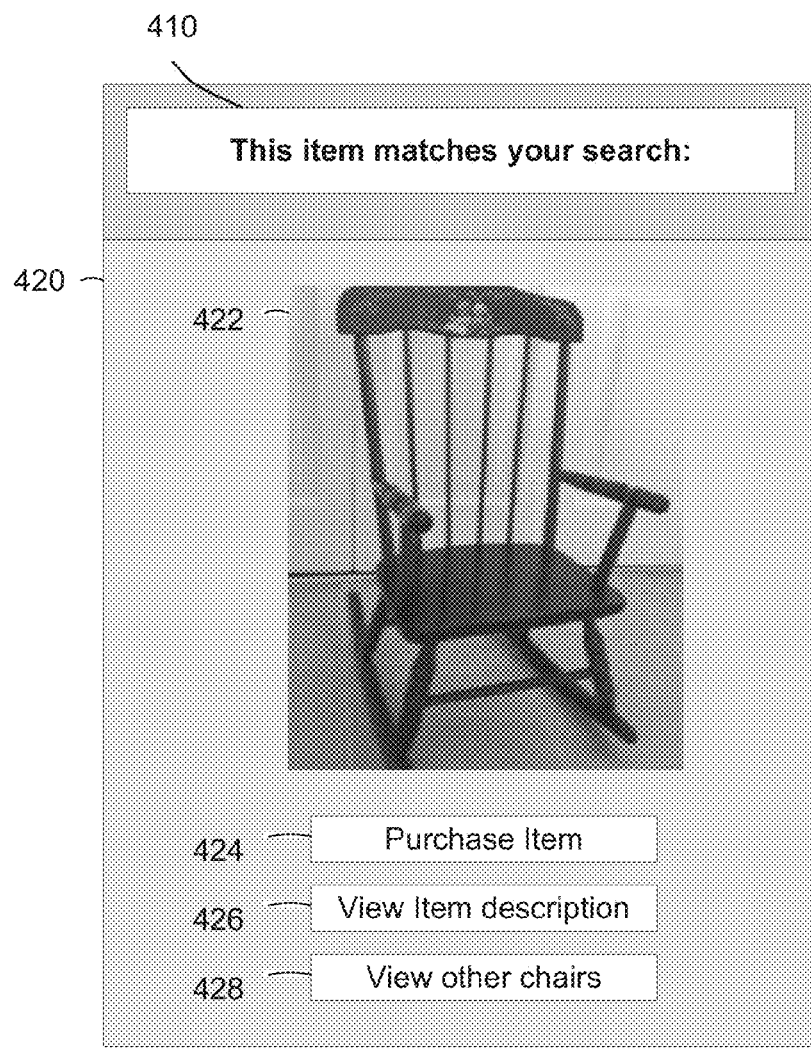
FIG. 4 is a display diagram illustrating an example user interface presenting an available item, in some example embodiments.

As an example, FIG. 4 depicts an example user interface 400 presenting an available item for purchase that matched an item in a query image. The user interface 400 includes a listing 410 of items offered for purchase by the network-based publication system 102, including a specific item 422 (e.g., an exact match of the image 322 in the query image depicted in the user interface 300 of FIG. 3) that is offered via a product purchase page 420 within the user interface 400. The user interface 400 also includes various user-selectable buttons that enable a user (e.g., a user that submitted the image 322 as a query image) to navigate through various pages and/or information presented by the network-based publication system 102, such as button 424 that, when selected, facilitates a purchase of the item 422; button 426 that, when selected, facilitates the display of additional product description information for the item 422; and/or button 428 that, when selected, facilitates the display of other items offered for purchase via the network-based publication system 102 that are similar to the item 422 (e.g., items recommended to the user based on characteristics of the user, among other things). Of course, the user interface 400 may include other elements not shown in FIG. 4.

Although the various components of the network-based publication system 102 have been discussed in terms of a variety of individual modules and engines, a skilled artisan will recognize that many of the components can be combined or organized in other ways. Furthermore, not all components of the network-based publication system 102 have been included in FIG. 2. In general, components, protocols, structures, and techniques not directly related to functions of example embodiments (e.g., dispute resolution engine, loyalty promotion engine, reputation engines, listing management engines, account engine) have not been shown or discussed in detail. The description given herein simply provides a variety of example embodiments to aid the reader in an understanding of the systems and methods used herein.

Figure 5:
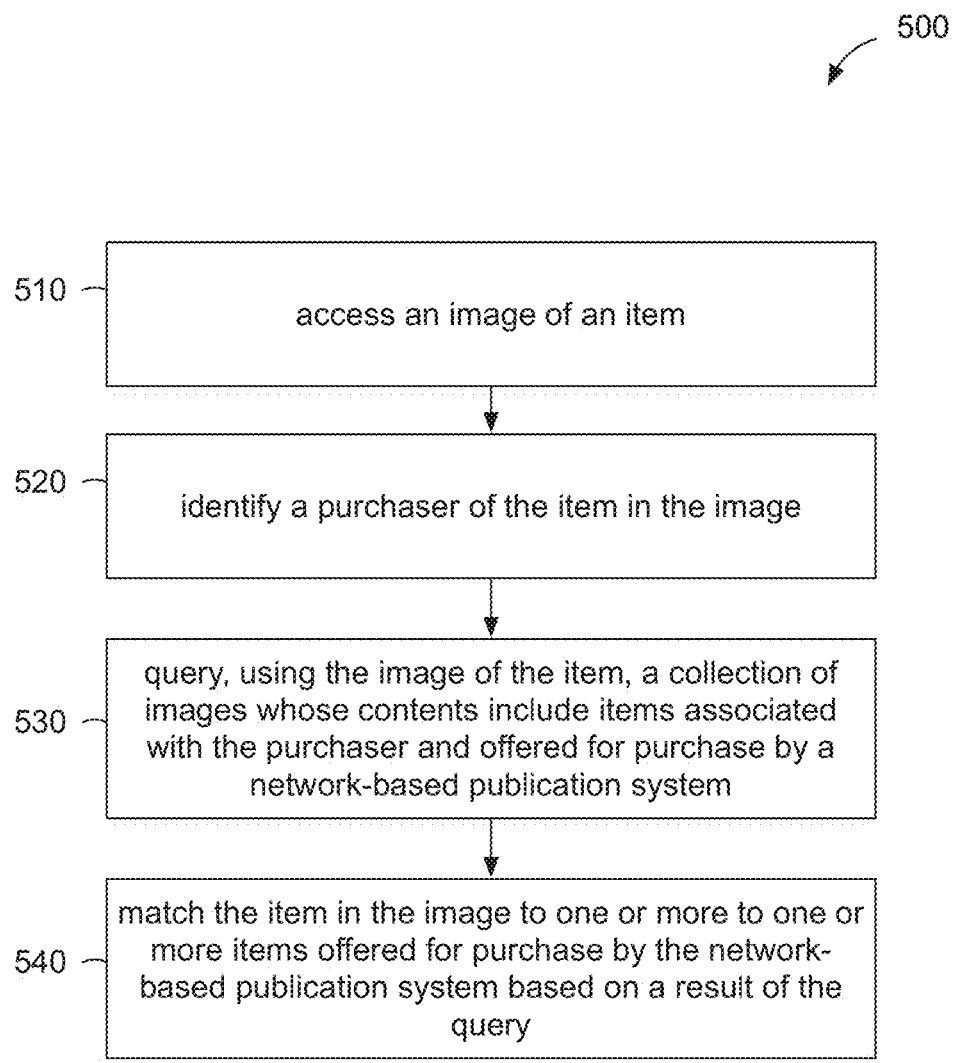
FIG. 5 is a flow diagram illustrating a method for identifying available products based on an image search, in some example embodiments.

As described herein, in some example embodiments, the searching engine 210 may utilize information that identifies purchasers or users associated with items within query images to constrain a total number of images searched using the query images, among other things. FIG. 5 is a flow diagram illustrating a method 500 for identifying available products based on an image search, in some example embodiments. The method 500 may be performed by the searching engine 210 and, accordingly, is described herein merely by way of reference thereto. It will be appreciated that the method 500 may be performed on any suitable hardware.

In operation 510, the searching engine 210 accesses an image of an item. For example, the image module 220 may receive and/or otherwise access information associated with an image of an item or object, such as information associated with an image taken and/or captured by a camera of the mobile device 106, 108 that is associated with a user of the network-based publication system 102.

In operation 520, the searching engine 210 identifies a purchaser of the item in the image. For example, the identification module 230 may identify the purchaser of the item in the image as a user that previously purchased the item from the network-based publication system 102, by receiving a user ID or other identification information associated with the user. As another example, the searching engine 210 may receive information identifying another user of the network-based publication system 102 as the purchaser of the item in the image from the user who provides the image of the item to the searching engine 210.

In operation 530, the searching engine 210 queries, using the image of the item, a collection of images whose contents include items associated with the purchaser and offered for purchase by a network-based publication system 102. For example, the image query module 240 may query a collection or group of images associated with items previously purchased by a user via the network-based publication system 102, may constrain the corpus of images to be searched to only include images for items or products associated with the purchaser of the item in the query image, and/or may constrain the corpus of images to be searched to only include images for items or products assigned certain metadata (e.g., keywords in the title or product description information, category IDs, product IDs, prices, and so on) that matches or is similar to metadata assigned to items associated with the purchaser within the network-based publication system 102, among other things.

In operation 540, the searching engine 210 matches the item in the image to one or more items offered for purchase by the network-based publication system 102 based on a result of the query. For example, the item match module 250 may perform various image or object recognition techniques described herein to determine the item matches another item, based on a result that characteristics of the query image of the item match at least one or more characteristics of one or more items offered by the network-based publication system 102.

As described herein, the item match module 250 may exactly or definitively determine that an item in the query image is a specific item (e.g., a specific rocking chair) currently or previously offered for purchase by the network-based publication system 102 and/or may determine that the item in the query image is associated with a category of items (e.g., is a "red shirt" or "pen") offered for purchase by the network-based publication system 102.

Figure 6:
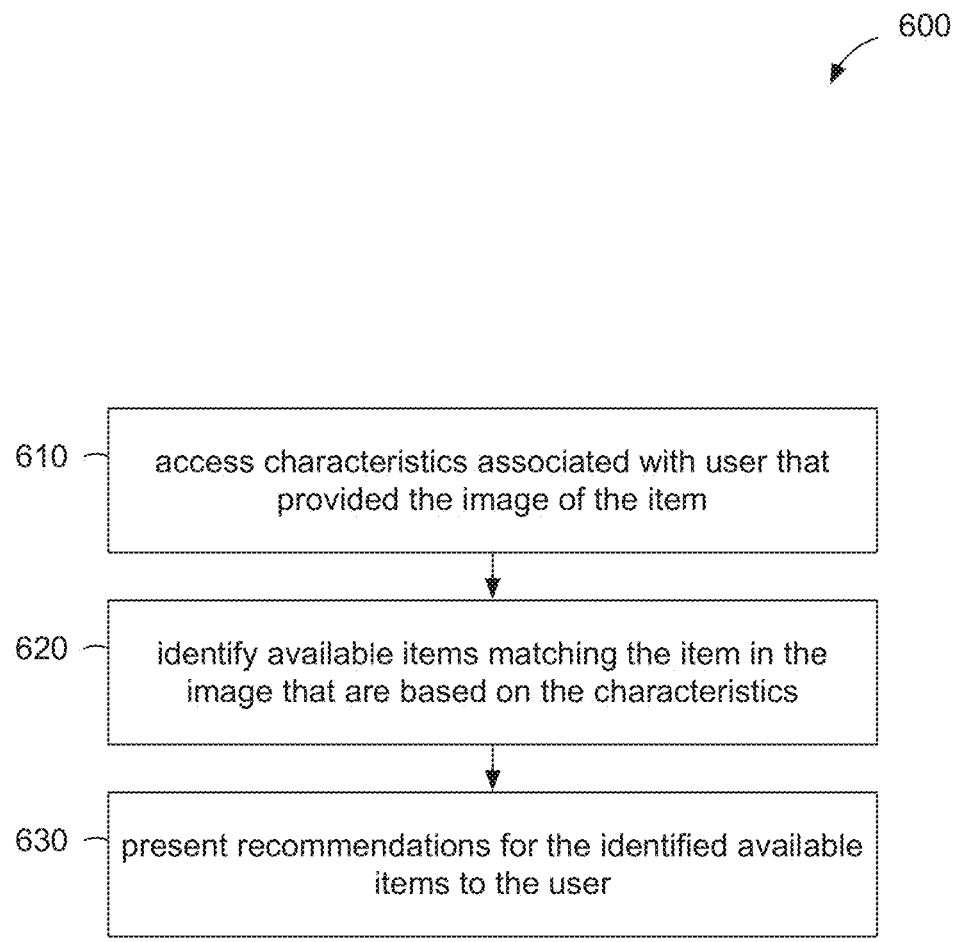
FIG. 6 is a flow diagram illustrating a method for presenting results of an image query, in some example embodiments.

As described herein, in some example embodiments, the network-based publication system 102, via the presentation module 260 and/or the publication engine 202, may present information to a user that submitted the image query that enables the user to purchase products that match an item in a query image and/or enables the user to view recommended products that are associated with the item in the query image, among other things. FIG. 6 is a flow diagram illustrating a method for presenting results of an image query, in some example embodiments. The method 600 may be performed by the presentation module 260 and/or the publication engine 202, and, accordingly, is described herein merely by way of reference thereto. It will be appreciated that the method 600 may be performed on any suitable hardware.

In operation 610, the presentation module 260 accesses characteristics for the user that provided the query image. For example, the presentation module 260 may access various biographical or other user characteristics, such as a user's location, age, behaviors, previous purchase history, sex, and so on.

In operation 620, the presentation module 260 identifies available items that match the item in the query image that are associated with and/or based on the characteristics of the user. For example, the presentation module 260 may identify items that are associated with a user type assigned to the user based on the characteristics for the user.

In operation 630, the presentation module 260 presents recommendations for the available items to the user. For example, the presentation module 260 may present recommendations to the user via the user interface 400, such as recommendation for items targeted to users of the certain user type assigned to the user.

For example, the presentation module 260 may access information identifying a user who submitted a query image whose contents included a watch, is located in Arizona, and identify two items of a group of items that matched the watch are similar watches being sold by sellers also located in Arizona. The presentation module 260 may present recommendations to the user associated with the two watches located in Arizona.

Figure 7:
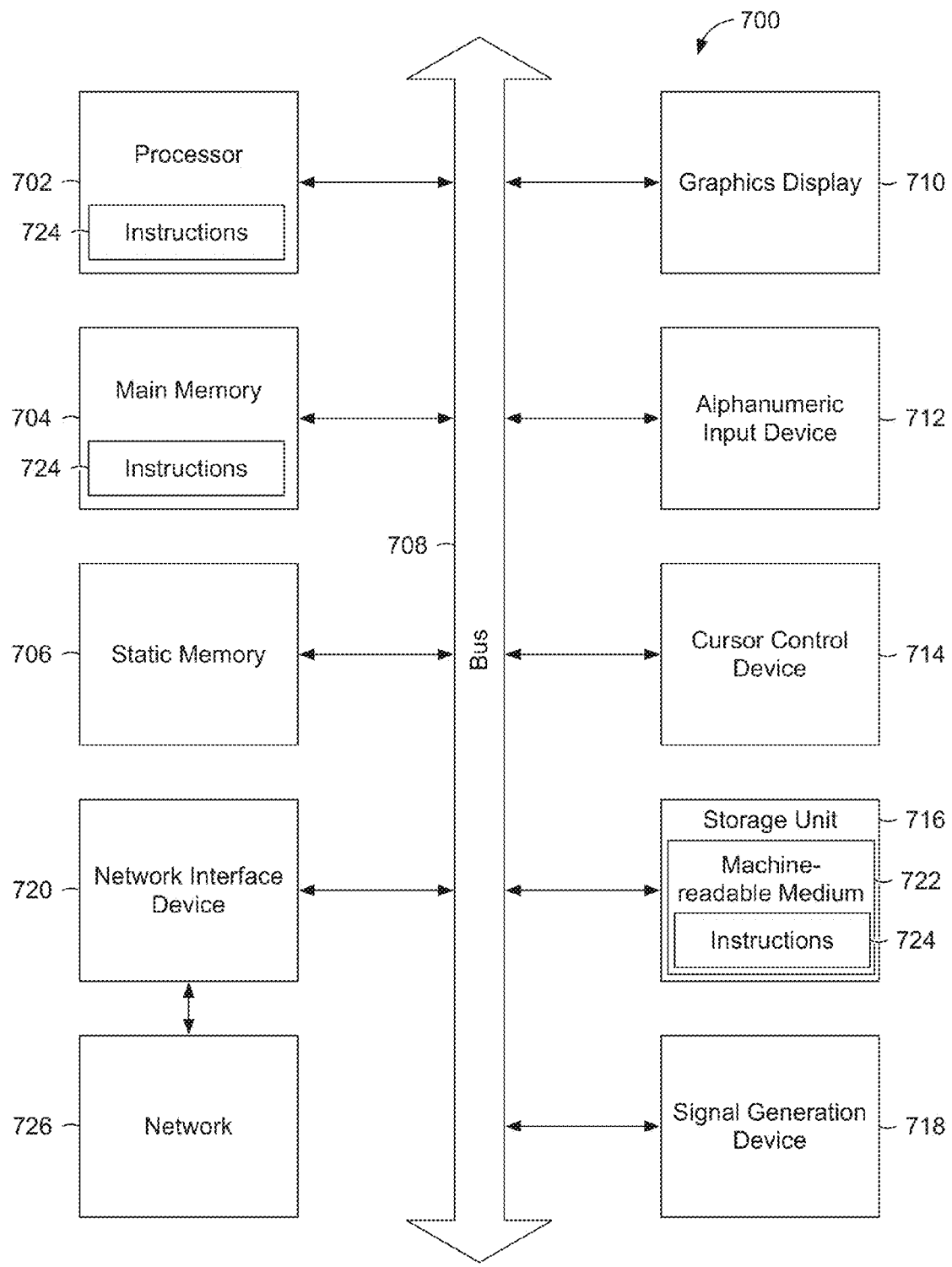
FIG. 7 shows a diagrammatic representation of a machine in the example form of a computer system within which a set of instructions may be executed to cause the machine to perform any one or more of the methodologies discussed herein.

FIG. 7 shows a diagrammatic representation of a machine in the exemplary form of a computer system 700 within which a set of instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a graphics display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a storage unit 716, a signal generation device 718 (e.g., a speaker) and a network interface device 720.

The storage unit 716 includes a machine-readable medium 722 on which is stored one or more sets of instructions 724 (e.g., software) embodying any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may further be transmitted or received over a network 726 via the network interface device 720.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions 724. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Although the present disclosure has been described with reference to specific exemplary embodiments, it may be evident that various modifications and changes may be made to these embodiments without departing from the broader spirit and scope of the disclosure. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

What is claimed is:

1. A system, comprising:
one or more processors; and
memory including instructions that, upon execution by the one or more processors, cause the system to:
receive a first image of an item from a client device associated with a first user of the system;
identify a second user of the system who is connected to the first user by a social network;
constrain an image search corpus to a collection of images of items purchased by the second user from the system;
identify the item by extracting one or more shapes or objects in the first image and matching, via content-based image retrieval, the one or more shapes or objects in the first image to one or more shapes or objects in a second image of the image search corpus; and
present, to the client device, information of one or more items offered for purchase by the system that have images whose shapes or objects are similar to the one or more shapes or objects in the second image.

2. The system of claim 1, wherein the client device captured the first image, and the instructions upon execution further cause the system to:
present, to the client device, information of a product purchase page of the system that facilitates a purchase of the one or more items offered for purchase by the system.

3. The system of claim 1, wherein the instructions upon execution further cause the system to:
present information of a product purchase page of the system that facilitates a purchase of the one or more items offered for purchase by the system.

4. The system of claim 1, wherein the client device captured the first image, and the instructions upon execution further cause the system to:
present, to the client device, recommendations based on user characteristics of the first user.

5. The system of claim 1, wherein the instructions upon execution further cause the system to:
receive identifying information of the second user from the client device.

6. The system of claim 1, wherein the instructions upon execution further cause the system to:
receive, from the client device, a selection of the second image from a plurality of images of the collection of images whose shapes or objects match the one or more shapes or objects of the first image.

7. The system of claim 1, wherein the instructions upon execution further cause the system to:
identify a category of the item in the first image,
wherein the image search corpus is further constrained by the category.

8. A method, comprising:
receiving, by a network-based publication system, a first image of an item from a client device associated with a first user of the network-based publication system;
identifying, using one or more processors of the network-based publication system, a second user of the network-based publication system who is connected to the first user by a social network;
constraining, by the one or more processors, an image search corpus to a collection of images of items previously purchased by the second user from the network-based publication system;
identifying, by the one or more processors, the item by extracting one or more shapes or objects in the first image and matching, via content-based image retrieval, the one or more shapes or objects in the first image to one or more shapes or objects in a second image of the image search corpus; and
presenting, by the network-based publication system to the client device, information of one or more items offered for purchase by the network-based publication system that have images whose shapes or objects are similar to the one or more shapes or objects in the second image.

9. The method of claim 8, wherein the client device captured the first image, the method further comprising:
presenting, to the client device, information of a product purchase page of the network-based publication system that facilitates a purchase of the one or more items offered for purchase by the network-based publication system.

10. The method of claim 8, further comprising:
presenting information of a product purchase page of the network-based publication system that facilitates a purchase of the one or more items offered for purchase by the network-based publication system.

11. The method of claim 8, wherein the client device captured the first image, the method further comprising:
presenting, to the client device, recommendations based on user characteristics of the first user.

12. The method of claim 8, further comprising:
receiving identifying information of the second user from the client device.

13. The method of claim 8, further comprising:
receiving, from the client device, a selection of the second image from a plurality of images of the collection of images whose shapes or objects match the one or more shapes or objects of the first image; and
identifying a category of the item in the first image,
wherein the image search corpus is further constrained by the category.

14. A tangible computer-readable storage medium having no transitory signals whose contents, when executed by one or more processors of a network-based publication system, cause the network-based publication system to perform operations, the operations comprising:
receiving a first image of an item from a client device associated with a first user of the network-based publication system;

identifying a second user of the network-based publication system who is connected to the first user by a social network;

constraining an image search corpus to a collection of images of items previously purchased by the second user from the network-based publication system;

identifying the item by extracting one or more shapes or objects in the first image and matching, via content-based image retrieval, the one or more shapes or objects in the first image to one or more shapes or objects in a second image of the image search corpus; and presenting, to the client device, information of one or more items offered for purchase by the network-based publication system that have images whose shapes or objects are similar to the one or more shapes or objects in the second image.

15. The tangible computer-readable storage medium of claim 14, wherein the client device captured the first image, and wherein the operations further comprise:

presenting, to the client device, information of a product purchase page of the network-based publication system that facilitates a purchase of the one or more items offered for purchase by the network-based publication system.

16. The tangible computer-readable storage medium of claim 14, wherein the operations further comprise:

receiving identifying information of the second user from the client device.

17. The tangible computer-readable storage medium of claim 14, wherein the operations further comprise:

receiving, from the client device, a selection of the second image from a plurality of images of the collection of images whose shapes or objects match the one or more shapes or objects of the first image.

18. The tangible computer-readable storage medium of claim 14, wherein the operations further comprise:

identifying a category of the item in the first image, wherein the image search corpus is further constrained by the category.

19. The tangible computer-readable storage medium of claim 14, wherein the operations further comprise:

presenting, to the client device, product description information of the one or more items offered for purchase by the network-based publication system.

20. The tangible computer-readable storage medium of claim 14, wherein the operations further comprise:

present, to the client device, recommendations based on user characteristics of the first user.

\* \* \* \* \*